US006946763B1

(12) United States Patent
Park

(10) Patent No.: US 6,946,763 B1
(45) Date of Patent: Sep. 20, 2005

(54) VIBRATION MOTOR

(75) Inventor: Young Il Park, Gwangju-si (KR)

(73) Assignee: LG Innotek Co., LTD, Seoul (KR)

( * ) Notice: Subject to any disclaimer, the term of this patent is extended or adjusted under 35 U.S.C. 154(b) by 0 days.

(21) Appl. No.: 10/865,926

(22) Filed: Jun. 14, 2004

(30) Foreign Application Priority Data

Apr. 29, 2004 (KR) ...................... 10-2004-0029761

(51) Int. Cl.[7] .............................................. H02K 7/06
(52) U.S. Cl. ........................ 310/81; 310/179; 310/208
(58) Field of Search ........................ 310/81, 179, 208, 310/233, 237, 261

(56) References Cited

U.S. PATENT DOCUMENTS 6,291,915 B1 * 9/2001 Yamaguchi ................. 310/71
6,630,759 B2 * 10/2003 Yamaguchi ................. 310/71
6,836,039 B2 * 12/2004 Choi et al. ................... 310/81

* cited by examiner

*Primary Examiner*—Thanh Lam
(74) *Attorney, Agent, or Firm*—Birch, Stewart, Kolasch & Birch, LLP

(57) ABSTRACT

A vibration motor includes: a lower case provided with a lower board; an upper case coupled with the lower case; a four-pole magnet provided on the lower case; a shaft supported between the lower case and the upper case; a rotor rotatably supported by the shaft with an eccentricity, in which a pair of coils is provided in the rotor at an angle ranging form 135° to 142° between centerlines thereof; a commutator formed on a bottom of the rotor with six segments; and a pair of brushes having lower parts contacted with the lower board and upper parts contacted with the segments of the commutator at an angle of 90° therebetween.

25 Claims, 20 Drawing Sheets

2nd, 6th Segments — Brush — 4th, 8th Segments    1st, 5th Segments — Brush — 3rd, 7th Segments 2nd Segment +, 3rd segment −

1st Segment +, 3rd segment −

1st Segment +, 2nd segment −

6th Segment +, 2nd segment −

6th Segment +, 1st segment −

5th Segment +, 1st segment −

5th Segment +, 6th segment −

4th Segment +, 6th segment −

1st Segment    3rd Segment
+V             −V

1st Segment    6th Segment
−V             +V

4th Segment    6th Segment
+V             −V

3rd Segment    4th Segment
+V             −V

VIBRATION MOTOR

This Non-provisional application claims priority under 35 U.S.C. § 119(a) on Patent Application No(s). 10-2004-002, 9761 filed in Korea on Apr. 29, 2004, the entire contents of which are hereby incorporated by reference.

BACKGROUND OF THE INVENTION

1. Field of the Invention

The present invention relates to a vibration motor, and more particularly, to a flat-type vibration motor.

2. Description of the Related Art

Flat-type vibration motors are used to attain vibratory motion for silent call of personal information appliances, such as mobile communication terminal.

A demand for the flat-type vibration motors are being increased as they are being used in mobile communication terminals for vibration means. A miniaturization and a lightweight are demanded for the mobile communication terminal, such that the vibration motor also needs to be compact but have a big vibratory motion.

Various types of flat-type vibration motors are provided to meet these demands.

A flat-type vibration motors according to the related art will now be described with reference to FIG. 1 through FIG. 4.

FIG. 1 is a cross-sectional view schematically showing a structure of a related art vibration motor. FIG. 2A is a plan view showing a structure of the related art vibration motor. FIG. 2B is a bottom view showing a structure of the rotor of the related art vibration motor. FIG. 2C is an equivalent circuit diagram showing connections between winding coils and a commutator of the related art vibration motor.

Referring to FIGS. 1, 2A and 2B, the related art vibration motor includes: a lower case 120 provided with a lower board 121; an upper case 110 to be coupled with the lower case 120; a four-pole magnet 140 disposed on the lower case 120; a shaft 130 supported between the lower case 120 and the upper case 110; a rotor 150 eccentrically supported by the shaft 130 to rotate; two coils 151 disposed in the rotor 150 at an included angle of 1200 therebetween based on a center thereof; a commutator 152 formed with eight segments and located beneath the rotor 150, the upper board 153 being formed on a bottom of the rotor 150; a pair of brushes 160 having bottoms attached on the lower board 121 and tops contacted with the segments of commutator 150, wherein the tops of the brushes 160 are arranged to have an included angle of 90° therebetween; and a weight 154 interposed between the coils 151.

A reference numeral 131 denotes a bearing for supporting a rotation of the shaft 130 and a reference numeral 132 denotes a washer to be coupled to the shaft 130.

In the commutator 152, a first and a fifth segments, a second and a sixth segments, a third and a seventh segments, and a fourth and an eighth segments are respectively connected to make electric current passages.

One of the two coils 151 is connected between the (second, sixth) segments and the (fourth, eighth) segments of the commutator 152.

The other of the two coils 151 is connected between the (first, fifth) segments and the (third, seventh) segments of the commutator 152.

Equivalent circuit diagrams of connections between the coils 151 and each segment of the commutator 152 are showed in FIG. 2C.

The related art vibration motor constructed as above operates such a manner that the rotor 150 is driven by attractive/repulsive forces between the magnet 140 and the coils 151.

FIGS. 3A through 3D are wiring diagrams to explain a operation of the related art vibration motor of which brushes have an included angle of 90°.

Referring to FIG. 3A, an anode of the brushes 160 is in contact with the seventh segment of the commutator 152 and a cathode of the brushes is in contact with the first segment of the commutator 152, such that a current flows through the coil 151 that is connected between the first and the seventh segments. A magnetic flux generated by the current flow interacts with a magnetic flux of the magnet 140 such that generates the attractive/repulsive force to rotate the rotor 150.

A contacting position between the brushes 160 and the commutator 152 is varied as the rotor 150 is rotating. FIGS. 3B through 3D show circuits according to the variation of the contacting position. Operation characteristics of the circuits are the same as those of FIG. 3A.

The included angle between the brushes 160 can be varied though it has been described with 90° as shown in FIGS. 3A through 3D.

FIGS. 4A and 4B are wiring diagrams illustrating a problem of the related art vibration motor having a brush angle greater than 90°, and FIGS. 5A and 5B are wiring diagrams illustrating a problem of the related art vibration motor having the brush angle less than 90°.

Referring to FIGS. 4A and 4B, in case the included angle of the brush pair 160 is greater than 90°, the anode of the brushes 160 may contact with the fifth segment and the cathode of the brushes 160 may contact with the eighth segment. In this case, the coil 151 is not applied with an electrical potential and thus the magnetic flux is not generated in the coil 151, thereby not allowing the rotor 150 to rotate.

Referring to FIGS. 5A and 5B, in case the included angle of the brush pair 160 is less than 90°, the anode of the brushes 160 may contact with the sixth segment and the cathode of the brushes 160 may contact with the seventh segment. In this case, the coil 151 is not applied with an electrical potential and thus the magnetic flux is not generated in the coil 151, thereby not allowing the rotor 150 to rotate.

In other words, the related art vibration motor having two coils and eight-segment commutator has a drawback in that death point occurs when the brush angle is out of 90°, such that the motor is not driven.

Another type of the related art vibration motor having two coils and a six-segment commutator is disclosed in Japanese Patent Laid-Open Publication No. 13-104882.

The disclosed vibration motor includes a four-pole magnet, in which North and South poles are alternately formed, and brushes arranged at a brush angle of 90°, and a pair of coils are arranged at an angle of 120° based on a center thereof. So, the disclosed vibration motor has a similar structure to that of the vibration motor shown in FIG. 1, except that it has the six-segment commutator.

FIGS. 6A, 6B and 6C are graphs showing an impressed current, a counter electromotive force, and a torque with respect to rotation angle of the rotor.

Referring to FIG. 6C, it is found that the related art vibration motor disclosed in Japanese Patent Laid-Open Publication No. 13-104882 has a large torque ripple of 50%.

Therefore, the disclosed vibration motor requires a high voltage input for operation owing to the large torque ripple, thereby reducing productivity.

As described above, the related art vibration motor having two coils and eight-segment commutator has a drawback in that the death point occurs when the brush angle is out of 90°, such that the motor is not driven. On the other hand, the related art vibration motor having two coils and six-segment commutator has a drawback that has a large torque ripple.

SUMMARY OF THE INVENTION

Accordingly, the present invention is directed to a vibration motor that substantially obviates one or more problems due to limitations and disadvantages of the related art.

One object of the present invention is to provide a vibration motor that is capable of applying a stable torque to a rotor when a pair of brushes is disposed at an angle out of 90° therebetween.

Another object of the present invention is to provide a vibration motor that has a reduced torque ripple.

A further another object of the present invention is to provide a vibration motor that require a low operational voltage owing to a reduced torque ripple.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a vibration motor includes: a four-pole magnet having alternately arranged N and S poles; a rotor including a pair of coils fixed at an angle ranging from 135° to 142° between centerlines of the respective coils based on the rotor center, the rotor being rotated using electromagnetic force between a magnetic flux of the four-pole magnet and a magnetic flux generated from the coils; a shaft provided to support the rotor; a commutator having six segments which are disposed on a predetermined portion of the rotor and electrically connected with the coils; and a pair of brushes provided to apply a current to the commutator.

In another aspect of the present invention, a vibration motor includes: a case; a magnet provided on inner surface of the case; a rotor which is eccentrically rotated by an electromagnetic force resulted from interaction with the magnet; a pair of coils fixed in a one portion of the rotor at an angle ranging from 135° to 142° between centerlines of the respective coils based on the rotor center; a weight formed between the pair of coils; a shaft inserted into the rotor and supported by the case; a commutator having six segments which are disposed on the other portion of the rotor and electrically connected with the coils; and a pair of brushes provided with an angle of 90° therebetween to apply a current to the commutator.

In a further another aspect of the present invention, a vibration motor includes: a shaft supported between coupled upper and lower cases; a four-pole magnet provided on the lower case; a rotor rotatably supported by the shaft with eccentricity; and brushes provided to apply an electric potential to a commutator formed on the rotor, wherein the rotor includes an upper board provided on a bottom of the rotor, two coils provided in a top of the rotor, a weight provided between the two coils, and a commutator provided with six segments on a bottom of the rotor, the two coils being fixed to the top of the rotor at an angle ranging from 135° to 142° between centerlines of the respective coils based on the rotor center, the brushes having lower parts connected to a lower board of the lower case and upper parts contacted with the segments of the commutator at an angle of 90° therebetween.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 7:
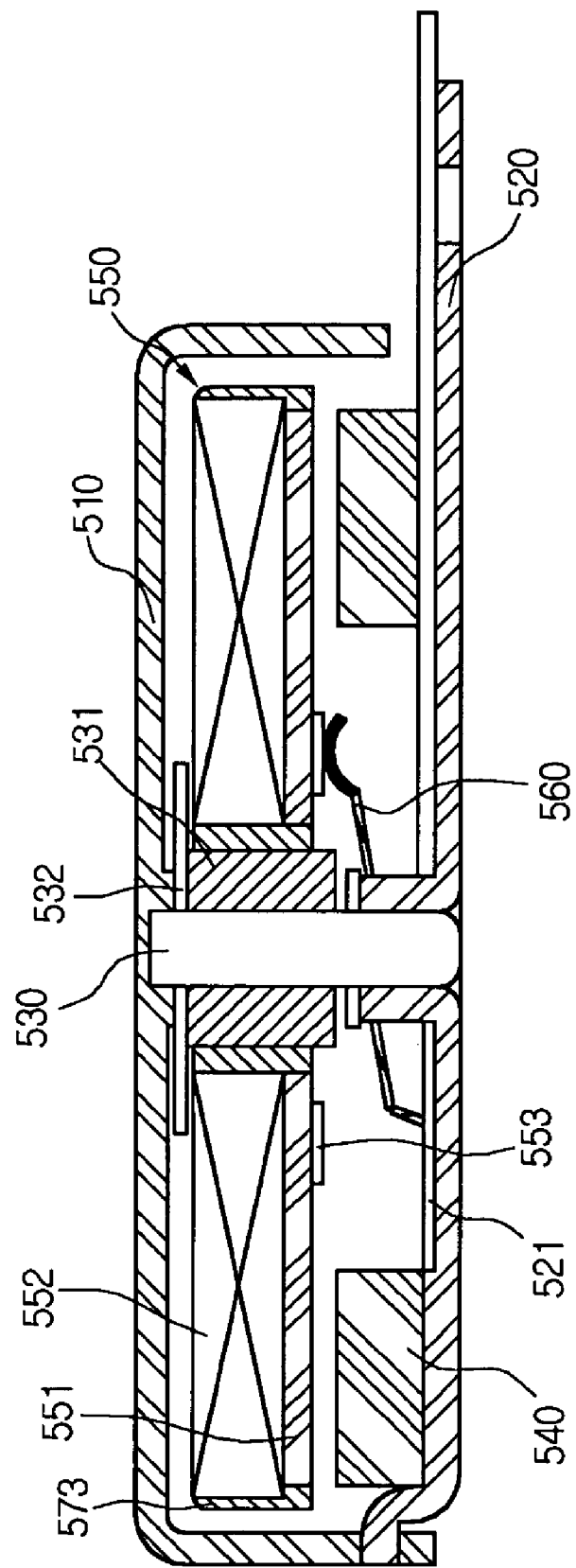
FIG. 7 is a sectional diagram of a vibration motor according to the present invention.
Figure 8A:
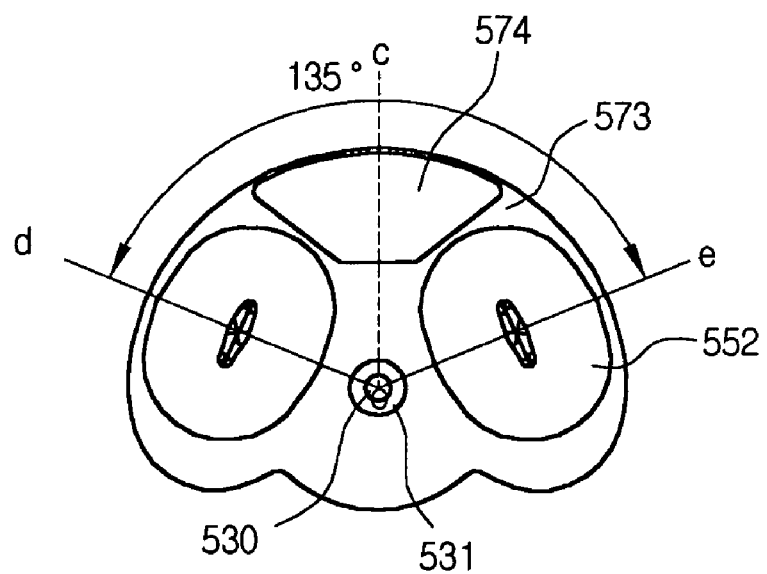
FIGS. 8A and 8B are diagrams schematically illustrating a structure of a rotor of the vibration motor according to the present invention.
Figure 8B:
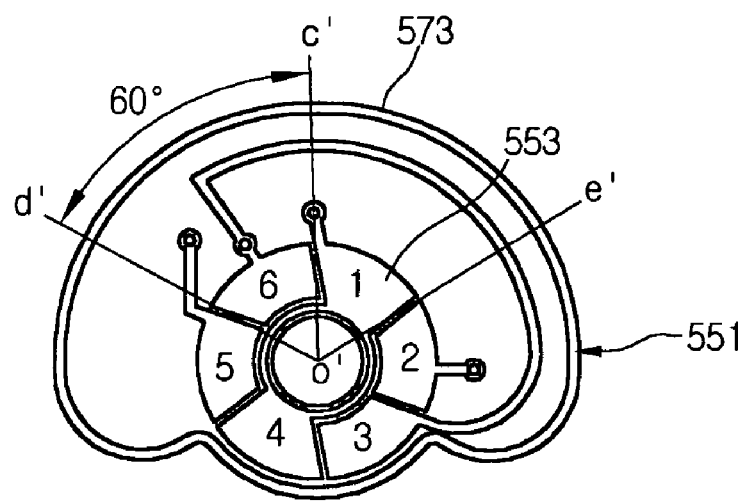

FIG. 7 is a sectional diagram of a vibration motor according to the present invention. FIGS. 8A and 8B are a top plan view and a bottom plan view of a rotor of a vibration motor according to the present invention.

Figure 9:
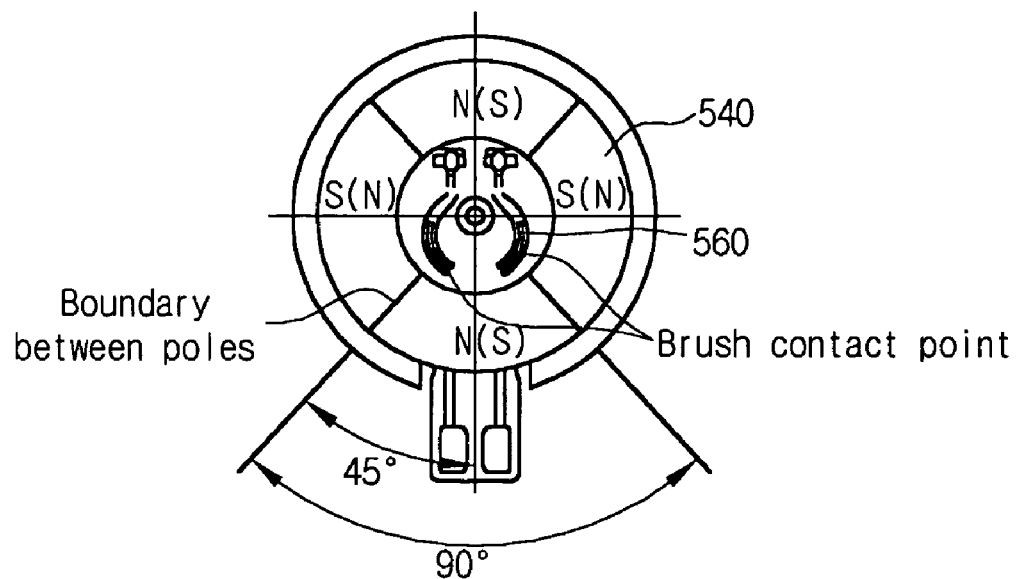
FIG. 9 is a diagram illustrating an arrangement of contact points of brushes and poles of a magnet in the vibration motor according to one embodiment of the present invention.
Figure 10:
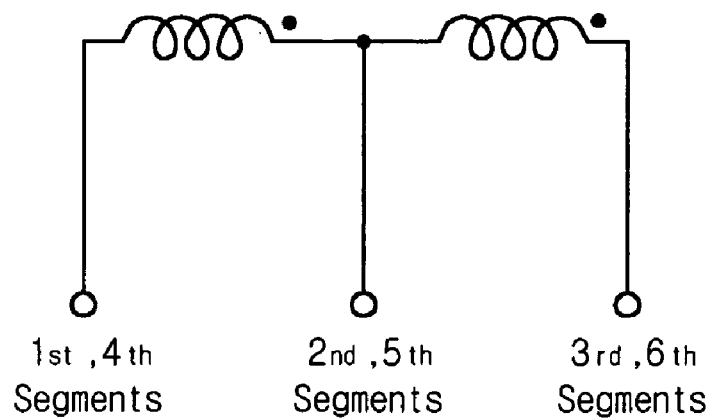
FIG. 10 is an equivalent circuit diagram illustrating connections between coils and a commutator of the vibration motor according to the present invention.

FIG. 9 is a diagram illustrating an arrangement of contact points of brushes and poles of a magnet in a vibration motor, and FIG. 10 is an equivalent circuit diagram illustrating connections between coils and a commutator of a vibration motor according to the present invention.

As shown, the vibration motor of the present invention includes an upper case 510 and a lower case 520, which are coupled with each other.

A lower board 521 is attached on the lower case 520 and a shaft 530 is supported between the upper case 510 and the lower case 520.

Lower parts of brushes 560 are attached on the lower board 521 and upper parts of the brushes 560 are contacted with a commutator 553 in order to supply power from an external power source.

The brushes are disposed at an angle of 90° therebetween and are contacted with segments of the commutator 553.

A ring-shaped magnet 540 is fixed on an upper surface of the lower case 520 in the circumference direction. The magnet 540 is arranged having alternately N and S poles.

Referring to FIG. 9, contact points of the brushes 560 and the commutator 553 are aligned with boundary lines between poles of the magnet 540 according to one embodiment of the present invention.

The rotor 550 having a semicircular disc shape is rotatably mounted to the shaft 530 and a pair of coils 552 is respectively installed on a top of the rotor 550 at an angle range of 135° through 142° therebetween based on the center of the rotor.

Though FIG. 8A shows the coils 552 arranged at an angle of 135°, it is not limited to the angle of 135°. As explained later, even though the angle range between the coils 552 is from 136° to 142°, the vibration motor of the present invention has a stable vibration motion and a reduced torque ripple compared with the related art vibration motor.

A weight 574 is disposed between the coil pair 552. The vibration motor has a vibratory motion owing to a shape of the rotor 550 and the weight 574. If the weight 574 becomes bigger, a vibratory force becomes bigger.

An upper board 551 is disposed on a bottom surface of the rotor 550, and the commutator 553 connected with the coil pair 552 is disposed on the upper board 551.

A void space of the rotor 550 is filled with an insulation resin 573.

The commutator 553 has six segments that are sequentially arranged in radial direction at the same radial angel of 60°.

Each segment of the commutator makes a circular shape centering on the shaft 530 and slidably contacts with the upper part of the brush 560 such that a current from an external power source can flow through the brush 560, the segment, and a coil 552 connected with the segment.

The current flow through the coil 552 generates a magnetic flux which interacts with a magnetic flux of the magnet 540 such that attractive/repulsive forces resulted from the interaction between the two fluxes rotates the rotor 550.

Referring to FIG. 8B, opposite segments of the commutator 553 are connected with each other through an electric wiring printed on the upper board 551. That is, a first segment is connected to a fourth segment, a second segment to a fifth segment, and a third segment to a sixth segment, respectively.

One of the coil pair 552 is connected between the first and the second segments of the commutator 553. The other of the coil pair 552 is connected between the sixth and the fifth segments of the commutator 553.

Therefore, if considering the connections between the segments and the connections between the segments and the coil pair 552, an entire connection state between the coil pair 552 and the commutator 553 is formed like FIG. 10.

A reference numeral 531 denotes a bearing that supports the shaft 530 and a reference numeral 532 denotes a washer that is coupled with the shaft 530.

FIGS. 11A through 11H are wiring diagrams illustrating an operation of a vibration motor according to the present invention.

An operational characteristic of the vibration motor with respect to a variation of contact points between the segments of the commutator 553 and the brushes 560 will now be described with reference to FIGS. 11A through 11H.

Figure 11A:
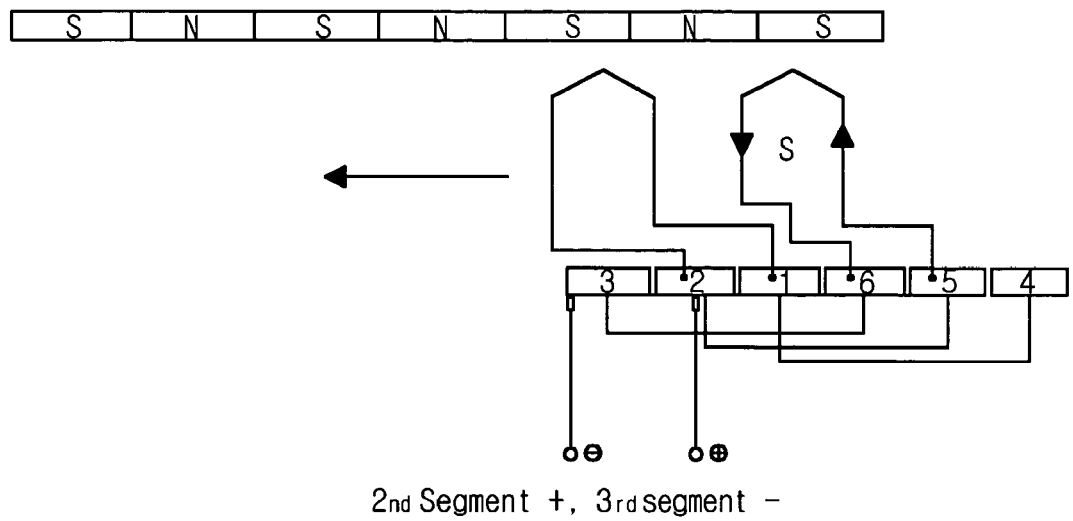
FIGS. 11A through 11H are wiring diagrams illustrating an operation of the vibration motor according to the present invention.

Referring to FIG. 11A, the second segment of the commutator 553 is applied with a positive (+) voltage and third segment is applied with a negative (−) voltage by the contacts of the brushes 560 and the commutator 553. Further, the fifth segment is applied with the (+) voltage because it is connected with the second segment, and the sixth segment is applied with the (−) voltage because it is connected with the third segment.

Therefore, a current flows the coil 552 which is connected between the fifth and sixth segments and thus a magnetic flux is generated around the coil 552, such that attractive/repulsive forces resulted from an interaction between the flux around the coil 552 and the flux of magnet 540 rotate the rotor 550.

Figure 11B:
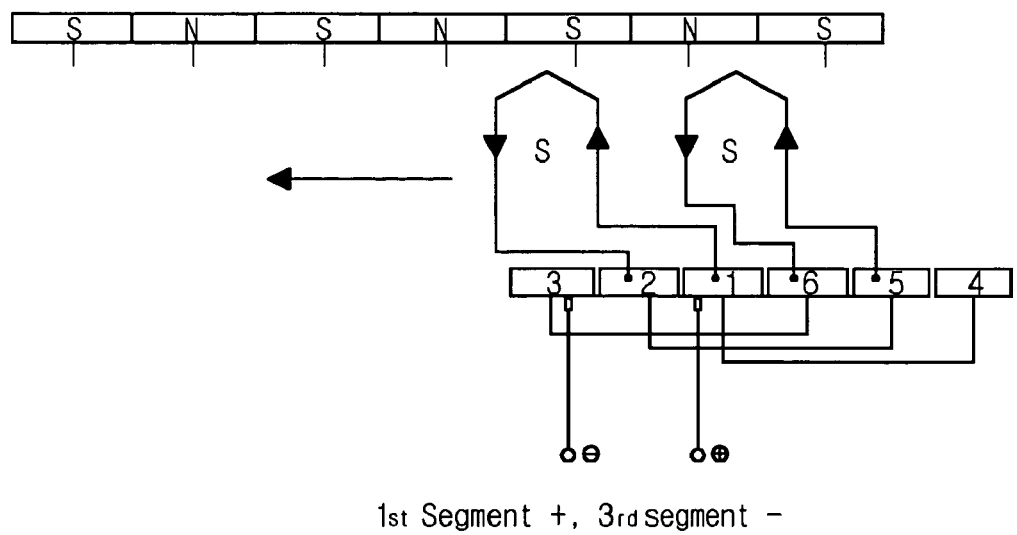
Figure 11C:
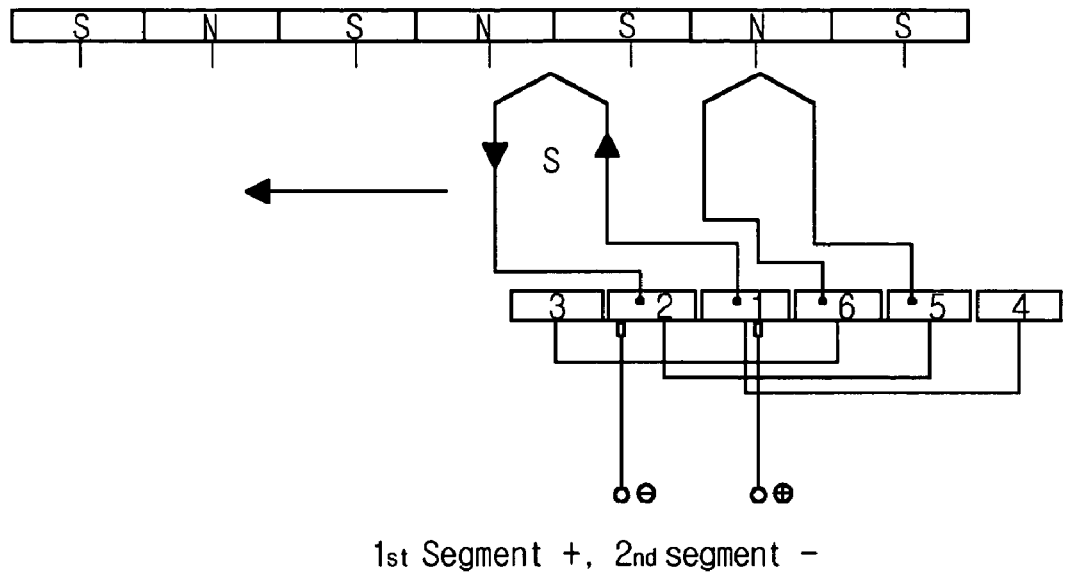
Figure 11D:
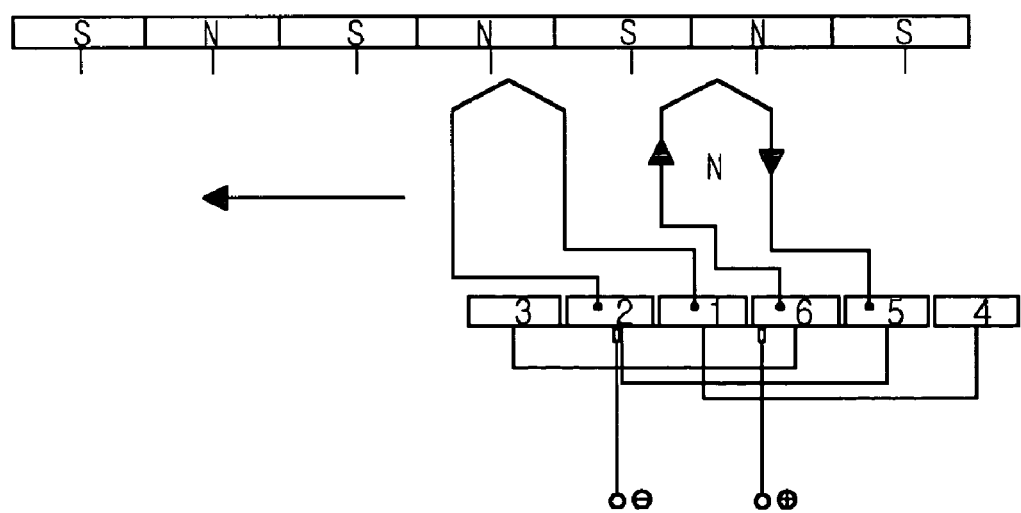

FIG. 11B shows sequential contact points of the brushes 560 and the commutator 553 after the rotor 550 is rotated by a certain angle from the position shown in FIG. 11A.

Referring to FIG. 11B, the first segment is applied with the (+) voltage and the third segment is applied with the (−) voltage.

A current can flow both through the coil 552 connected between the first and second segments and the coil 552 connected between the fifth and sixth segments.

That is, a closed loop circuit is formed in such a sequence that an anode (+) of the brushes 560, the first segment, the coil, the second segment, the fifth segment, the coil, the sixth segment, the third segment, and an cathode (−) of the brushes 560. Therefore, the attractive/repulsive forces resulted from an interaction between the flux around the coils 552 and the flux of magnet 540 rotate the rotor 550.

FIGS. 11C through 11H shows sequential contact points of the brushes 560 and the commutator 553 according to the rotation of the rotor 550. Since the operational characteristics shown in FIGS. 11C through 11H are the same as the concept shown in FIGS. 11A and 11B, their descriptions will be omitted.

The vibration motor of the present invention having two coils and a six-segment commutator applies a stable torque to the rotor 550 even though the brush angle is out of 90°.

Specifically, since each segment of the six-segment commutator has a bigger central angle than that of the eight-segment commutator, the present invention vibration motor having the six-segment commutator drives more stably than the related art vibration motor having the eight-segment commutator, even when the brush angle is out of 90°.

Referring again to FIG. 8B, the centerlines going through each center of the coils 552 lie adjacent to a tangential line of the first and the sixth segments.

That is, the coils 552 are disposed to have such an alignment that a switching time of the brushes 560 and the segments is varied, thereby allowing the coils 552 to be fixed on the rotor 550 at an angle range of 135° through 142° therebetween without unstable driving of the rotor 550.

Referring again to any one of FIGS. 11A through 11H, the first coil 552 is sequentially connected between the second and the first segments of the commutator 553, and continuously, the second coil 552 is sequentially connected between the sixth and the fifth segments.

With this arrangement of the coils 552 and commutator 553, the rotor 550 is rotated stably by the attractive/repulsive forces resulted from the flux of coils 552 and the flux of magnet 540 even when the angle between the coils 552 varies at 135° through 142°.

FIGS. 12A through 12D are equivalent circuit diagrams showing 4 cases of "2-phase on" according to the present invention (the "2-phase on" means a state that a current flows both through the two coils 552).

Figure 12A:
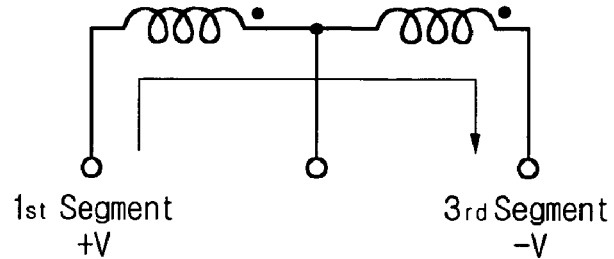
FIGS. 12A through 12D are conceptual circuit diagrams of a vibration motor when a two-phase on is presented according to the present invention.

First, FIG. 12A corresponding to FIG. 11B shows that the brushes 560 are connected to the first and third segments respectively.

Herein, the closed loop circuit is formed including the anode (+) of the brushes 560—the first segment—the first coil 552—the second segment—the fifth segment—the second coil 552—the sixth segment—the third segment—the cathode (−) of the brushes 560, thereby allowing a current to flow through both the first and second coils 552.

Figure 11E:
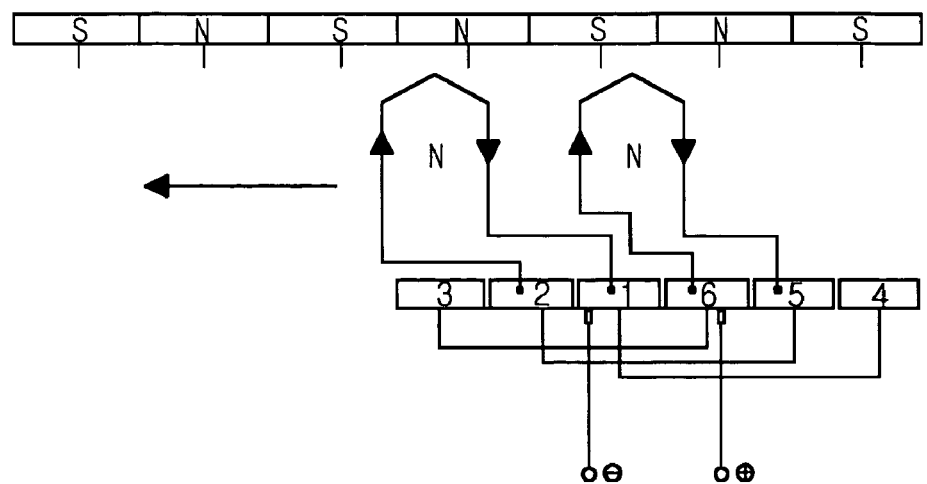
Figure 11F:
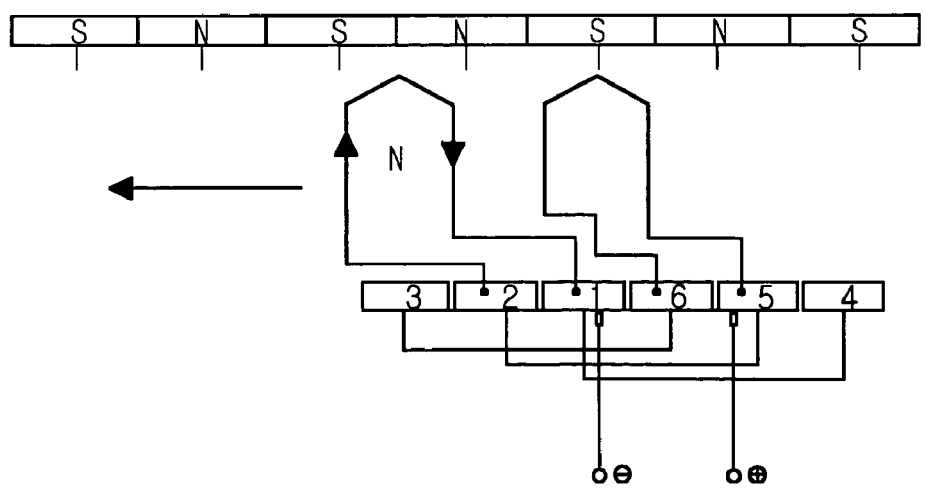
Figure 11G:
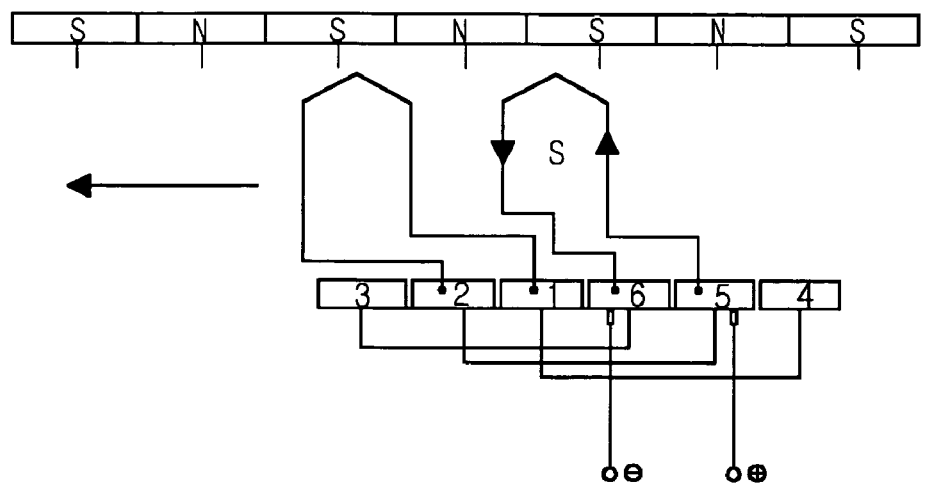
Figure 12B:
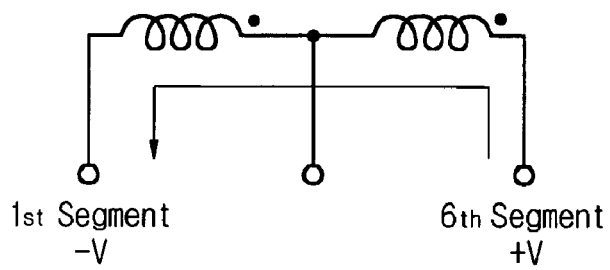

Second, FIG. 12B corresponding to FIG. 11E shows that the brushes 560 are connected to the first and sixth segments, respectively.

Herein, the closed loop circuit is formed with the anode (+) of the brushes 560—the sixth segment—the second coil 552—the fifth segment—the second segment—the first coil 552—the first segment—the cathode (−) of the brushes 560, thereby allowing the current to flow through both the first and second coils 552.

Figure 11H:
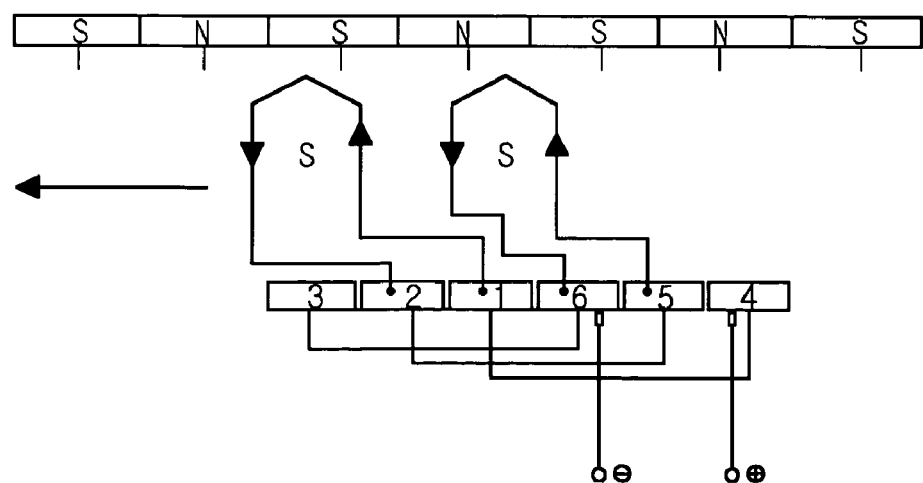
Figure 12C:
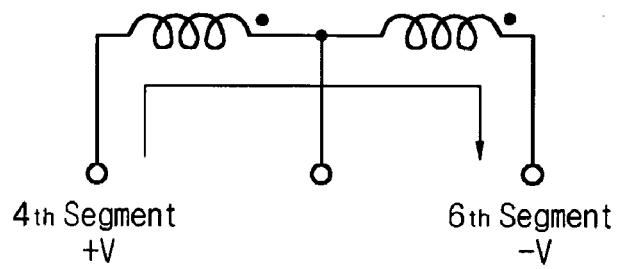

Third, FIG. 12C corresponding to FIG. 11H shows that the brushes 560 are connected to the fourth and sixth segments, respectively.

Herein, the closed loop circuit is formed with the anode (+) of the brushes 560—the fourth segment—the first segment—the first coil 552—the second segment—the fifth segment—the second coil 552—the sixth segment—the cathode (−) of the brushes 560, thereby allowing the current to flow through both the first and second coils 552.

Figure 12D:
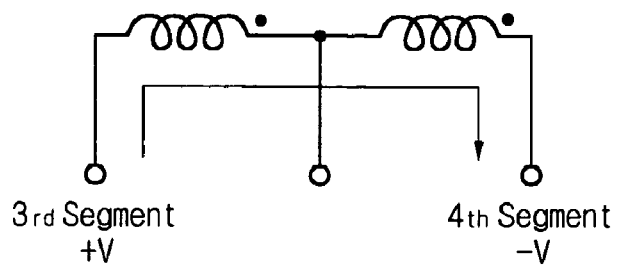

Fourth, FIG. 12D shows that the brushes 560 are respectively connected to the third and fourth segments, although not shown in the wiring diagrams (FIGS. 11A through 11H).

Herein, the closed loop circuit is formed with the anode (+) of the brushes 560—the third segment—the sixth segment—the second coil 552—the fifth segment—the second segment—the first coil 552—the first segment—the fourth segment—the cathode (−) of the brushes 560, thereby allowing the current to flow through both the first and second coils 552.

If the current flows both the two coils 552 as like the above four cases (2-phase on state), an overall resistance is doubled and the current flow becomes half such that the vibration motor consumes low electricity, thereby extending battery lifetime, brush lifetime, and so on.

As described above, the rotor 550 having eccentricity is driven by the attractive/repulsive forces resulted from the interaction between the magnetic fluxes around the coils 552 and the magnet 540. Therefore, a vibration of the eccentric rotor 550 is transmitted to the upper case 510 and the lower case 520.

Figure 13:
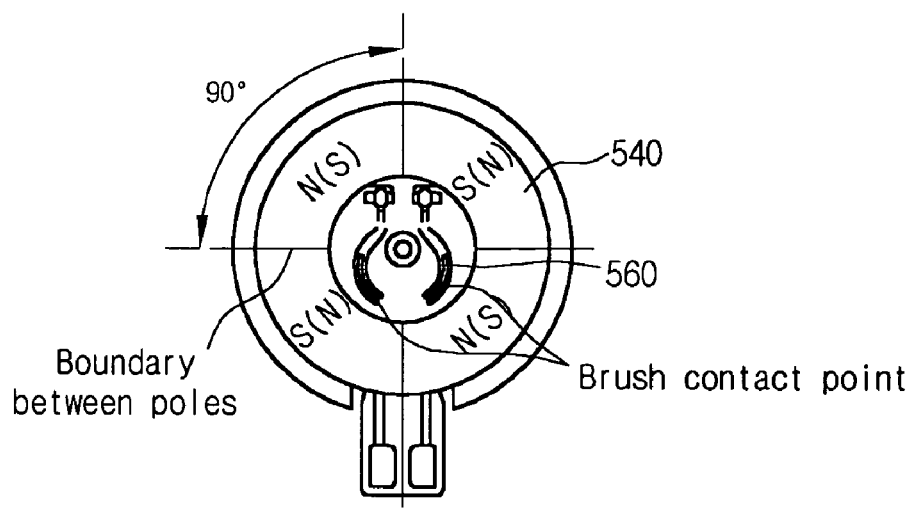
FIG. 13 is a diagram illustrating an arrangement of contact points of brushes and poles of a magnet in a vibration motor according to another embodiment of the present invention.

FIG. 13 shows arrangement of the contact points of the brushes 560 with respect to a pole array of the magnet 540 according to another embodiment of the present invention.

Referring to FIG. 13, the structure of the vibration motor is similar to the structure shown in FIG. 7, except for arrangement of the brushes 560 and the poles of the magnet 540. That is, the contact points of the brushes 560 and the commutator 553 are positioned in the center of the magnet pole.

Figure 14:
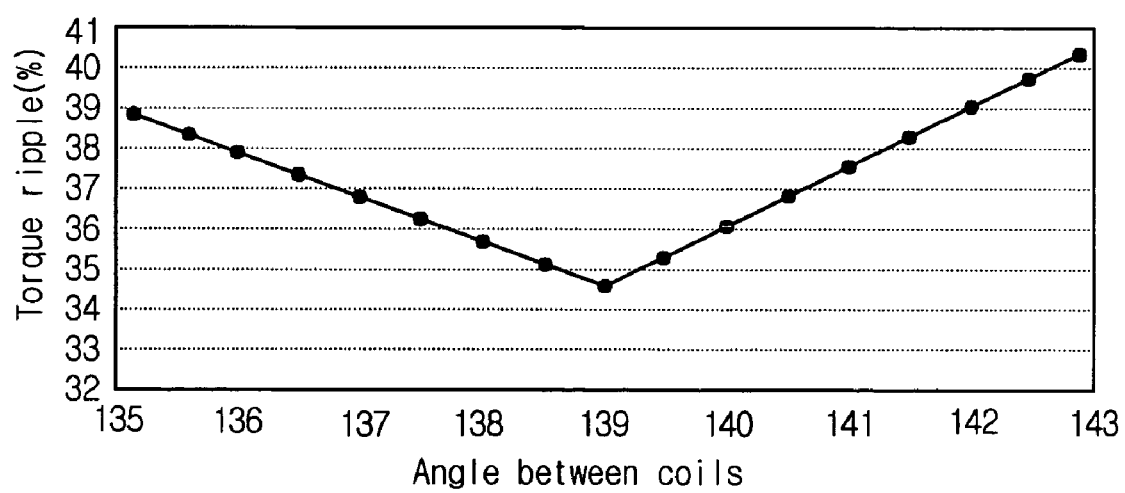
FIG. 14 is a graph illustrating a torque ripple waveform with respect to variation of an angle between centers of coils in the vibration motor according to the present invention.

FIG. 14 is a graph illustrating a torque ripple waveform with respect to variation of the angle between centerlines of the coils 552 in the vibration motor of the present invention.

Referring to FIG. 14, the torque ripple has minimum value when the angle is 139° and gradually increases when the angle departs from the angle of 139°.

Not only at the 139° angle between the centerlines of the coils 552 but also across the angle range of 135° through 142°, the torque ripple value of the present invention vibration motor has less value than 50% torque ripple of the related art vibration motor.

Figure 15A:
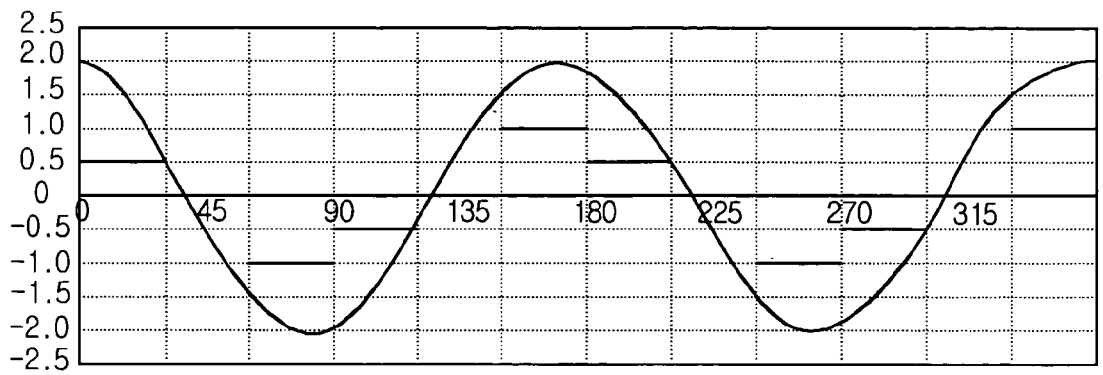
FIGS. 15A through 15C are graphs illustrating an impressed current, a counter electromotive force, and a torque with respect to phase of a vibration motor according to the present invention.
Figure 15B:
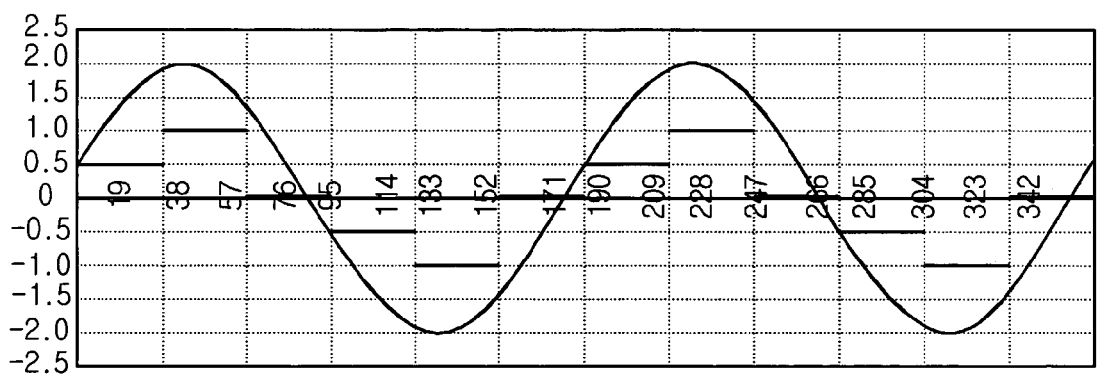
Figure 15C:
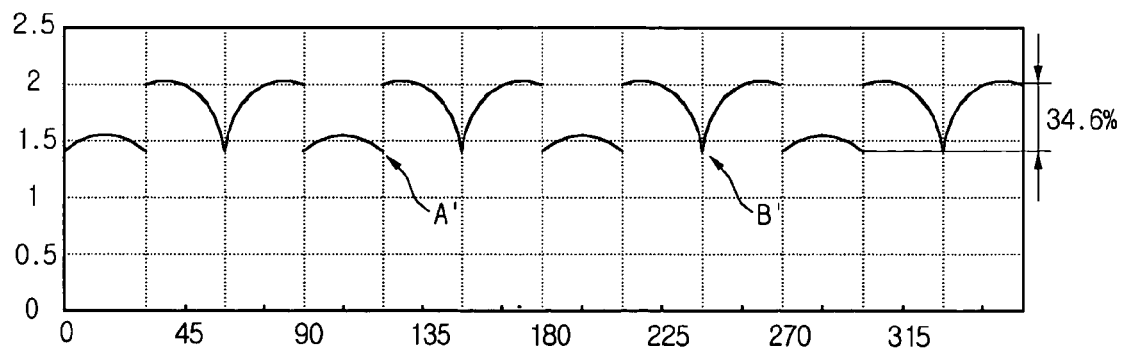

FIGS. 15A through 15C are graphs each illustrating an impressed current, a counter electromotive force, and a torque of the vibration motor with respect to phase angle according to the present invention.

Figure 1:
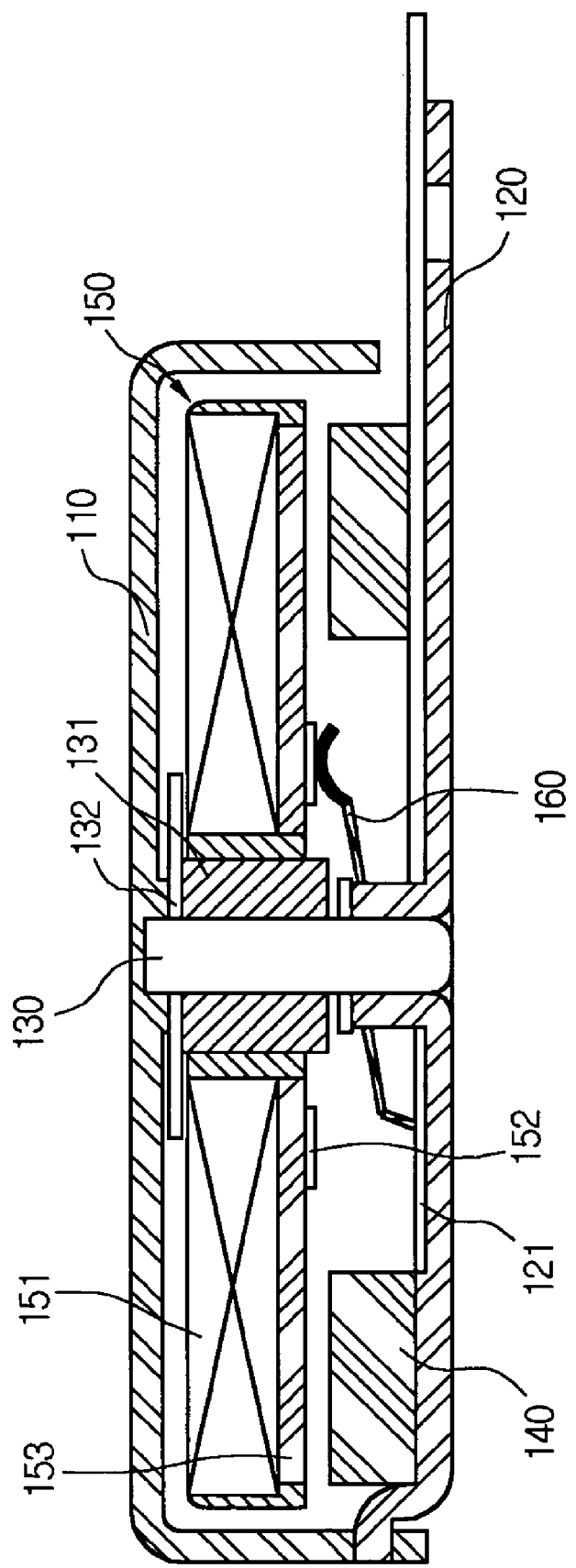
FIG. 1 is a sectional diagram schematically illustrating a structure of a related art vibration motor.
Figure 2A:
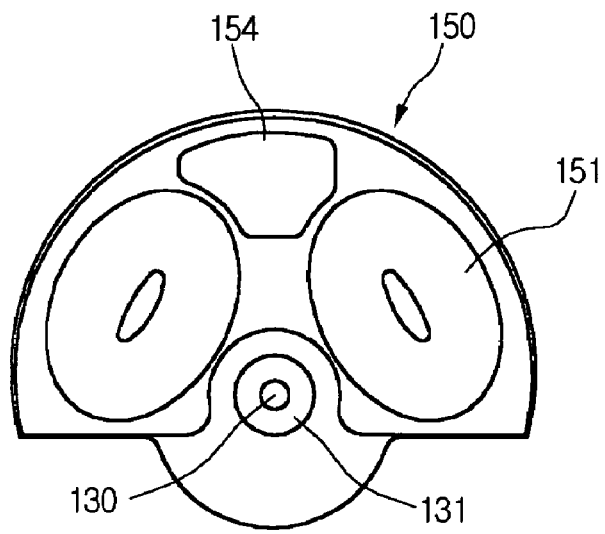
FIGS. 2A and 2B are diagrams illustrating a structure of a rotor of the related art vibration motor.
Figure 2B:
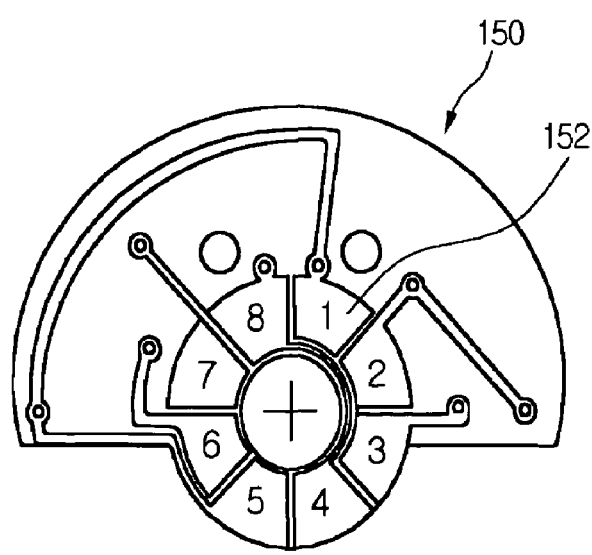
Figure 2C:
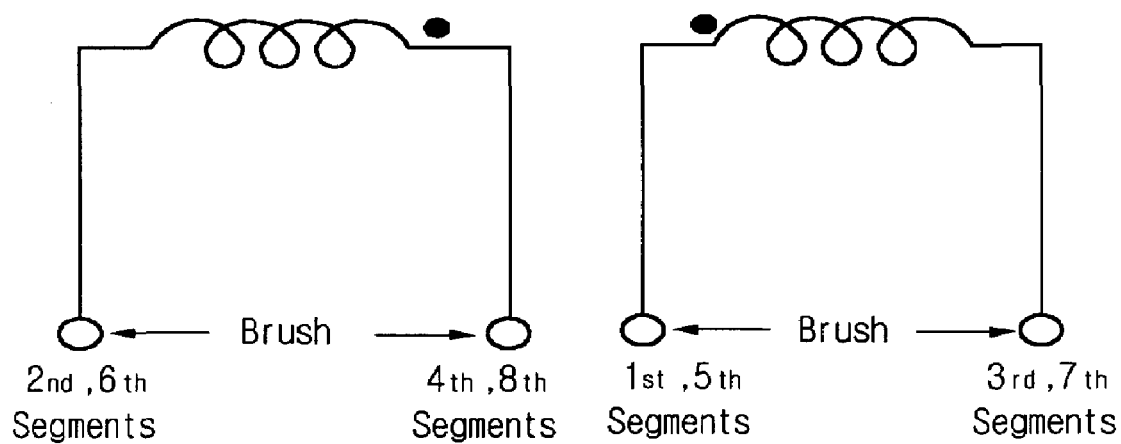
FIG. 2C is a conceptual diagram illustrating connections between coils and a commutator of the related art vibration motor.
Figure 3A:
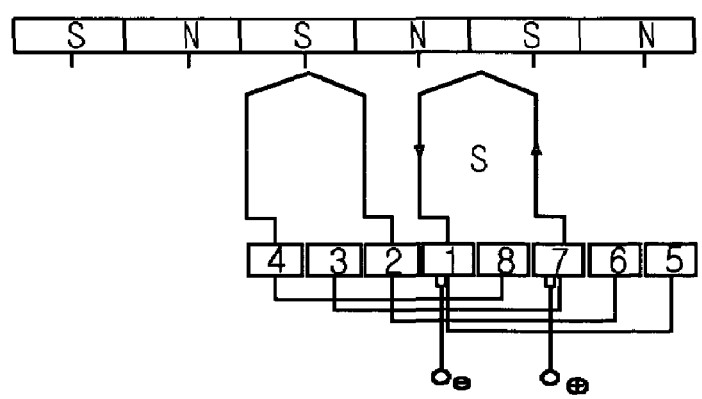
FIGS. 3A through 3D are wiring diagrams to explain operation of the related art vibration motor with a brush angle of 90°.
Figure 3B:
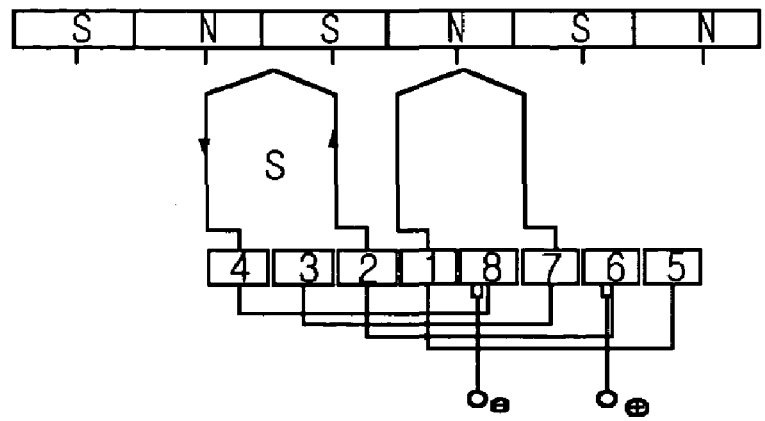
Figure 3C:
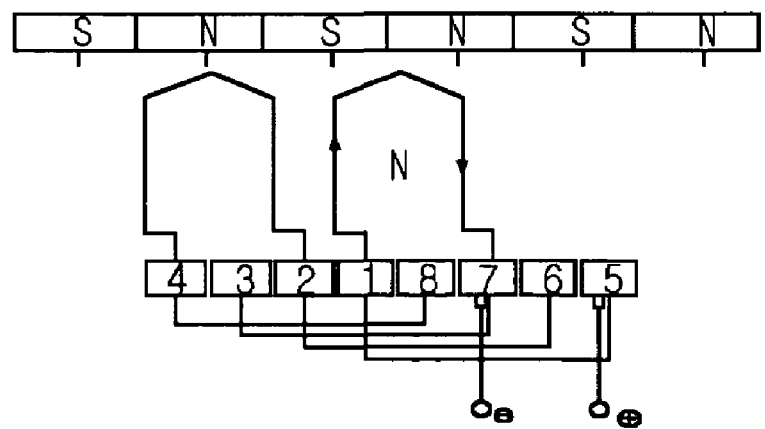
Figure 3D:
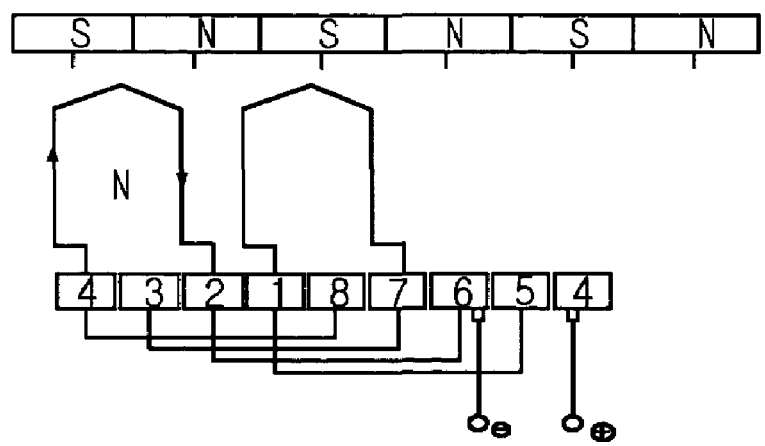
Figure 4A:
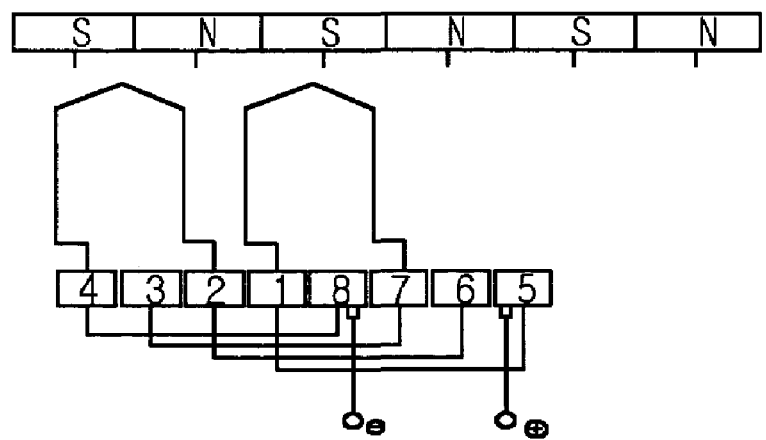
FIGS. 4A and 4B are wiring diagrams illustrating an operational drawback of the related art vibration motor when a brush angle is greater than 90°.
Figure 4B:
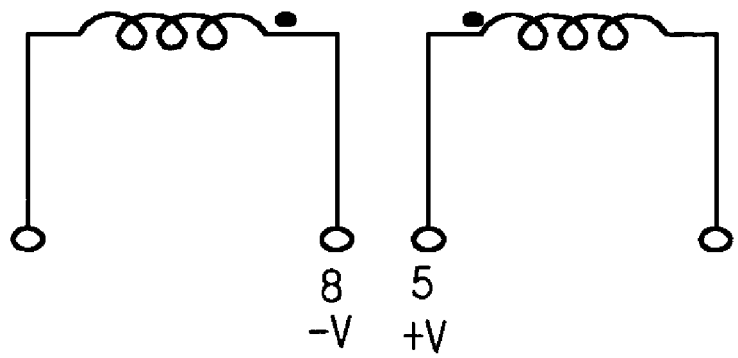
Figure 5A:
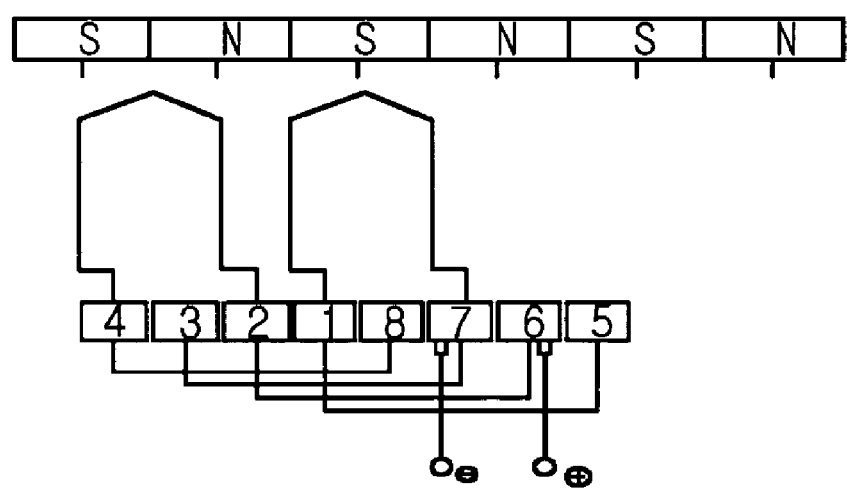
FIGS. 5A and 5B are wiring diagrams illustrating an operational drawback of the related art vibration motor when a brush angle is less than 90°.
Figure 5B:
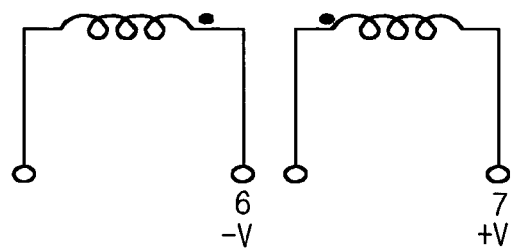
Figure 6A:
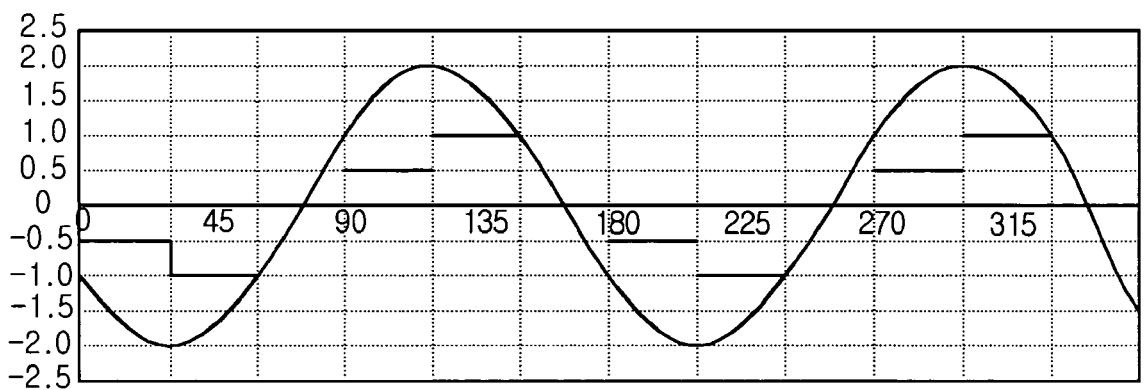
FIGS. 6A through 6C are graphs illustrating an impressed current, a counter electromotive force, and a torque with respect to phase of the related art vibration motor.
Figure 6B:
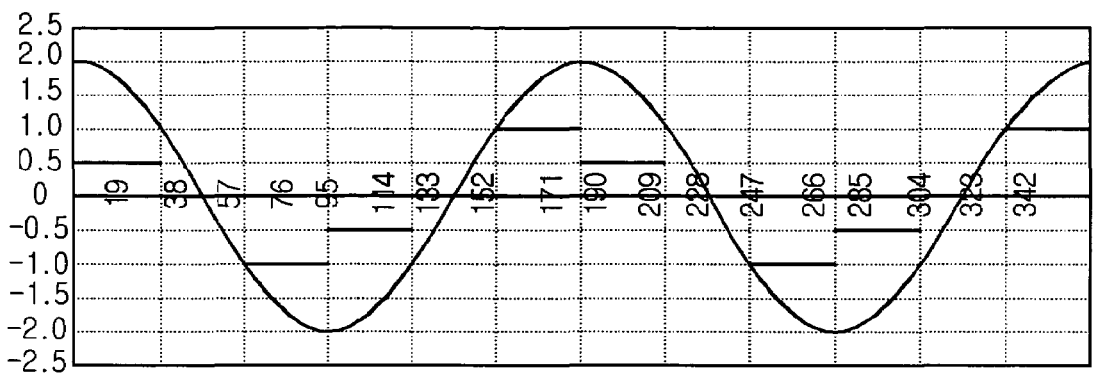
Figure 6C:
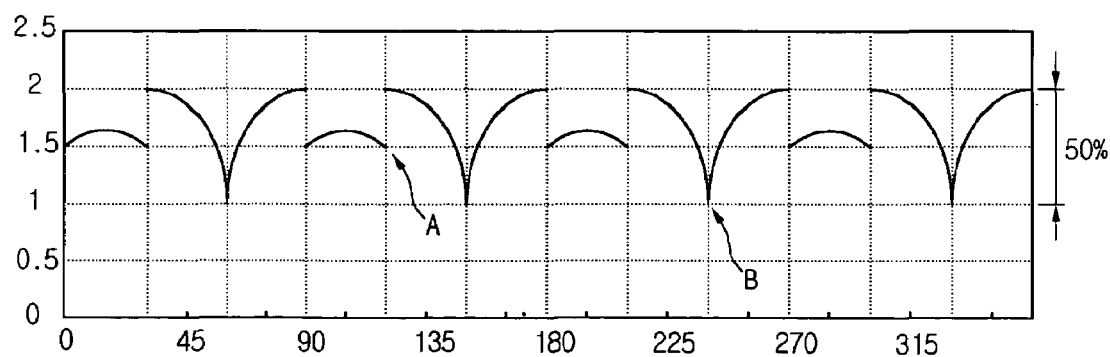

If the torque waveforms of FIGS. 15C and 6C are compared, the present inventive vibration motor (FIG. 15C) has minimal torque at A' or B' points equaled at the equivalent level, and exhibits a torque ripple of 34.6%, but the related art vibration motor (FIG. 6C) having minimal torque at B point exhibits a torque ripple of 50%. Thus, it can be noted that the vibration motor of the present invention has an improved torque ripple property.

Figure 16:
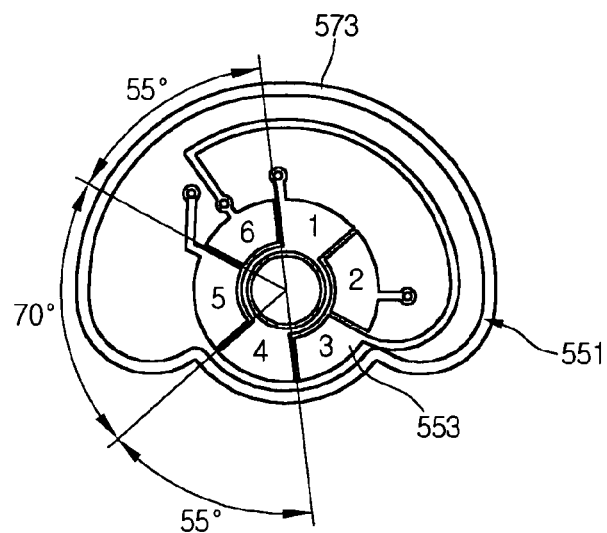
FIG. 16 is a diagram of a commutator having segments of which angles are not equal according to a further another embodiment of the present invention.

Referring to FIG. 16, there shows a commutator 553 that has non-equiangular segments according to a further another embodiment of the present invention.

Angles of second and fifth segments of the commutator 553 are 70° and angles of the other segments are 55°.

Described above, in case the respective brushes 560 having brush angle of 90° are contacted between the first and the third segments, or the first and sixth segments, or the fourth and sixth segments, or the third and fourth segments of the non-equivalent commutator that has six segments, the vibration motor is under "2-phase on" state.

The vibration motor under the 2-phase on state has twice as much equivalent impedance as the vibration motor under 1-phase on state, so that the current flow is reduced by half and the torque output of the vibration motor is also reduced by half.

Therefore by reducing the angle of the segments corresponding to the 2-phase on, the vibration motor can be in the 1-phase on state much more during one cycle of the vibration motor operation, increasing torque output.

If the commutator having the non-equiangular segments is used, the amount of vibration of the vibration motor is also increased owing to the increased torque output.

Herein, if only the angle of the second and fifth segments is greater than that of the other segments, the same result can be attained without limiting the angle of the second and fifth segments to the embodiment shown in FIG. 16.

Figure 17A:
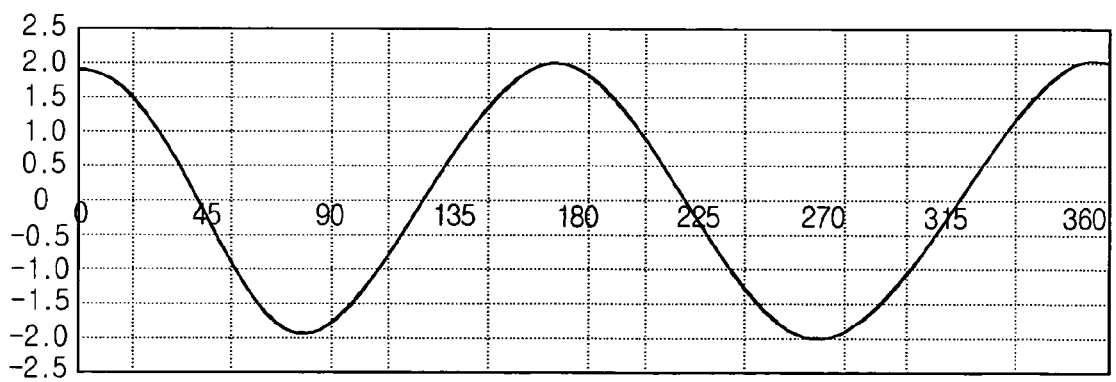
FIGS. 17A through 17C are graphs illustrating an impressed current, a counter electromotive force, and a torque with respect to phase of a vibration motor having the commutator of FIG. 16 according to the present invention.
Figure 17B:
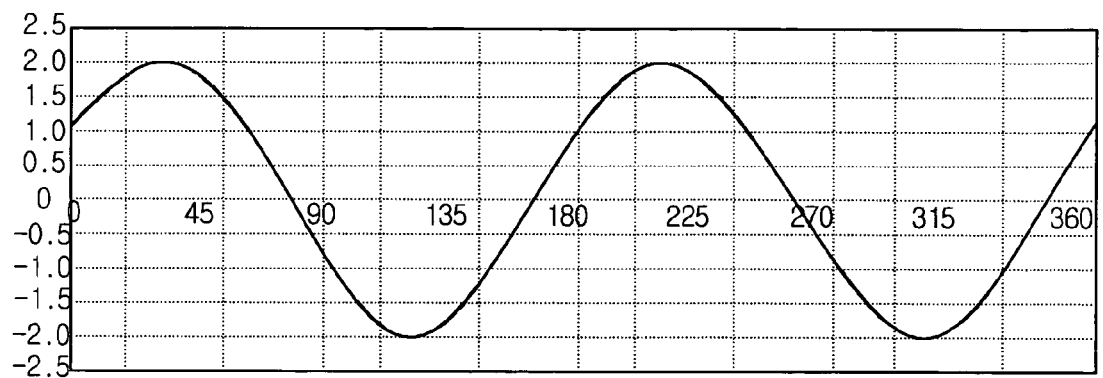
Figure 17C:
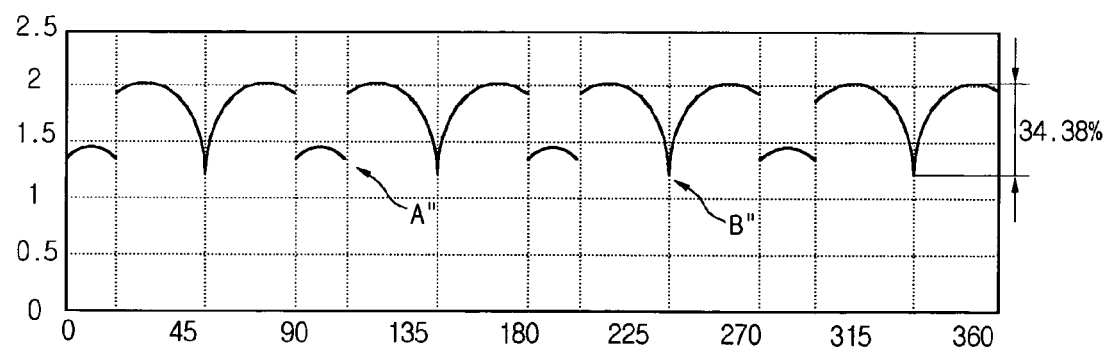

An impressed current, a counter electromotive force, and a torque output with respect to phase of the vibration motor having the non-equiangular segment commutator are showed in FIGS. 17A through 17C.

Referring to FIGS. 17A through 17C, the vibration motor having the non-equiangular segment commutator according to the present invention has sharply reduced torque ripple of 34.38% compared to a 50% torque ripple of the related art vibration motor (FIG. 6C).

As described above, the vibration motor having two coils and six-segment commutator is driven stable when the brush angle is out of 90°.

Further, the vibration motor has the reduced torque ripple and thus the operation voltage is reduced.

Furthermore, the two coils are disposed in the rotor at wider angles therebetween so that a bigger weight can be disposed therebetween.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A vibration motor comprising:
a four-pole magnet having alternate N and S poles;
a rotor including a pair of coils fixed at an angle ranging from 135° to 142° between centerlines of the respective coils based on the rotor center, the rotor being rotated using electromagnetic force between a magnetic flux of the four-pole magnet and a magnetic flux, which is generated from the coils;
a shaft provided to support the rotor;
a commutator having first to sixth segments which are disposed on a predetermined portion of the rotor and electrically connected with the coils; and
a pair of brushes provided to apply a current to the commutator.

2. The vibration motor of claim 1, further comprising a weight formed between the coils for increasing eccentricity.

3. The vibration motor of claim 1, wherein the brushes are arranged at an angle of 90° therebetween.

4. The vibration motor of claim 1, wherein the commutator has the first and fourth opposite segments connected each other, the second and fifth opposite segments connected each other, and the third and sixth opposite segments connected each other.

5. The vibration motor of claim 1, wherein one coil of the pair of coils has one end connected to the first segment of the commutator and the other end connected to the second segment of the commutator, and the other coil of the pair of coils has one end connected to the sixth segment of the commutator and the other end connected to the fifth segment of the commutator.

6. The vibration motor of claim 1, wherein the angle between centerlines of the respective coils based on the rotor center is 135°.

7. The vibration motor of claim 1, wherein the angle between centerlines of the respective coils based on the rotor center is 139°.

8. The vibration motor of claim 1, wherein the commutator has equiangular six segments.

9. The vibration motor of claim 1, wherein the commutator has non-equiangular six segments.

10. A vibration motor comprising:
a case;
a magnet provided on inner surface of the case;
a rotor which is eccentrically rotated by an electromagnetic force resulted from interaction with the magnet;
a pair of coils fixed in a one portion of the rotor at an angle ranging from 135° to 142° between centerlines of the respective coils based on the rotor center;
a weight formed between the pair of coils;
a shaft inserted in the rotor and supported by the case;
a commutator having first to sixth segments which are disposed on the other portion of the rotor and electrically connected with the coils; and
a pair of brushes with an angle of 90° therebetween provided to apply a current to the commutator.

11. The vibration motor of claim 10, wherein the commutator has the first and fourth opposite segments connected each other, the second and fifth opposite segments connected each other, and the third and sixth opposite segments connected each other.

12. The vibration motor of claim 10, wherein one coil of the pair of coils has one end connected to the first segment of the commutator and the other end connected to the second segment of the commutator, and the other coil of the pair of coils has one end connected to the sixth segment of the commutator and the other end connected to the fifth segment of the commutator.

13. The vibration motor of claim 10, wherein the angle between centerlines of the respective coils based on a center of the rotor is 135°.

14. The vibration motor of claim 10, wherein the angle between centerlines of the respective coils based on a center of the rotor is 139°.

15. The vibration motor of claim 10, wherein the commutator has equiangular six segments.

16. The vibration motor of claim 10, wherein the commutator has non-equiangular six segments.

17. A vibration motor comprising:
a shaft supported between coupled upper and lower cases;
a four-pole magnet provided on the lower case;
a rotor rotatably supported by the shaft with eccentricity; and
brushes provided to apply an electric potential to a commutator formed on the rotor,
wherein the rotor includes an upper board provided on a bottom of the rotor, first and second coils provided in a top of the rotor, a weight provided between the two coils, and a commutator provided with first to sixth segments on a bottom of the rotor, the two coils being fixed to the top of the rotor at an angle ranging from 135° to 142° between centerlines of the respective coils based on the rotor center, the brushes having lower parts connected to a lower board of the lower case and upper parts contacted with the segments of the commutator at an angle of 90° therebetween.

18. The vibration motor of claim 17, wherein the commutator has the first and fourth opposite segments connected each other, the second and fifth opposite segments connected each other, and the third and sixth opposite segments connected each other.

19. The vibration motor of claim 17, wherein a wiring between the commutator and the two coils is formed by connecting the second segment with one end of the first coil, connecting the first segment with the other end of the first coil, connecting the sixth segment with one end of the second coil, and connecting the fifth segment with the other end of the second coil.

20. The vibration motor of claim 17, wherein contact points of the brushes and the commutator are positioned on extended lines of boundary lines of the magnet poles.

21. The vibration motor of claim 17, wherein contact points of the brushes and the commutator are positioned in parallel with an extended horizontal boundary line of the magnet poles.

22. The vibration motor of claim 17, wherein an angle between centerlines of the respective coils based on a center of the rotor is 135°.

23. The vibration motor of claim 17, wherein an angle between centerlines of the respective coils based on a center of the rotor is 139°.

24. The vibration motor of claim 17, wherein the first to sixth segments of the commutator are equiangular segments.

25. The vibration motor of claim 17, wherein the first and sixth segments of the commutator are non-equiangular segments.

* * * * *